(12) United States Patent
Lindmark et al.

(10) Patent No.: US 8,919,691 B2
(45) Date of Patent: Dec. 30, 2014

(54) LIFE-SAVING VEHICLE

(75) Inventors: Jan-Evert Lindmark, Haparanda (SE); Juhani Niinivaara, Koria (FI)

(73) Assignee: Well-Head Rescue AB, Haparanda (SE)

( * ) Notice: Subject to any disclaimer, the term of this patent is extended or adjusted under 35 U.S.C. 154(b) by 192 days.

(21) Appl. No.: 13/702,995

(22) PCT Filed: Jun. 7, 2011

(86) PCT No.: PCT/SE2011/050696
§ 371 (c)(1),
(2), (4) Date: Mar. 1, 2013

(87) PCT Pub. No.: WO2011/155892
PCT Pub. Date: Dec. 15, 2011

(65) Prior Publication Data
US 2013/0153706 A1    Jun. 20, 2013

(30) Foreign Application Priority Data

Jun. 8, 2010   (SE) ...................................... 1050584

(51) Int. Cl.
| | |
|---|---|
| B64C 27/00 | (2006.01) |
| B64C 27/52 | (2006.01) |
| B63B 39/06 | (2006.01) |
| B64C 27/22 | (2006.01) |
| B64C 27/08 | (2006.01) |
| B64C 27/50 | (2006.01) |
| B63B 1/04 | (2006.01) |
| B64C 27/82 | (2006.01) |
| B64C 25/32 | (2006.01) |

(52) U.S. Cl.
CPC ......... *B64C 27/08* (2013.01); *B64C 2027/8281* (2013.01); *B64C 27/52* (2013.01); *B63B 39/06* (2013.01); *B64C 27/22* (2013.01); *B64C 2025/325* (2013.01); *B64C 27/50* (2013.01); *B63B 1/041* (2013.01); *B63B 1/047* (2013.01)
USPC ........................ 244/17.11; 244/101; 244/12.1

(58) Field of Classification Search
USPC ............................ 244/17.11, 12.1, 12.2, 23 C
See application file for complete search history.

(56) References Cited

U.S. PATENT DOCUMENTS

| | | | |
|---|---|---|---|
| 1,701,762 A | 2/1929 | Pitcairn |
| 1,884,848 A | 10/1932 | Pitcairn |

(Continued)

FOREIGN PATENT DOCUMENTS

| | | |
|---|---|---|
| AU | 2537792 | 4/1993 |
| DE | 406441 | 11/1924 |

(Continued)

*Primary Examiner* — Isam Alsomiri
*Assistant Examiner* — Justin Benedik
(74) *Attorney, Agent, or Firm* — Knobbe, Martens, Olson & Bear, LLP

(57) ABSTRACT

The invention concerns a life-saving vehicle (10) designed as a hollow body with the form of a sphere or disk essentially flattened along a vertical axis (16) that demonstrates its greatest width in a horizontal plane (15) and which body, composed of an upper part (11) and a lower part (13), limits an internal passenger compartment (25), whereby the body comprises a stabilizing arrangement (12) that stabilizes the vehicle when it is in water, a telescopic arrangement (40), a stabilization means (14) arranged at the lower part, which stabilization means can be displaced in a vertical direction downwards from the lower part through activation of the telescopic arrangement (40). The vehicle, in order for it to travel not only in the air but also in water, comprises: a first and second rotor (52, 17), a motor (55) with an associated transmission (54), a pair of propulsion units (60) and a stabilizing fin (65).

12 Claims, 4 Drawing Sheets

(56) References Cited

U.S. PATENT DOCUMENTS

| | | | |
|---|---|---|---|
| 4,023,751 A * | 5/1977 | Richard | 244/23 C |
| 4,044,972 A * | 8/1977 | Anker-Holth | 244/12.2 |
| 4,071,206 A | 1/1978 | Magill | |
| 4,796,836 A * | 1/1989 | Buchelt | 244/23 R |
| 5,035,377 A * | 7/1991 | Buchelt | 244/12.1 |
| 5,344,100 A * | 9/1994 | Jaikaran | 244/12.2 |
| 5,653,404 A * | 8/1997 | Ploshkin | 244/12.2 |
| 6,179,247 B1 * | 1/2001 | Milde, Jr. | 244/23 A |
| 6,705,905 B1 * | 3/2004 | Tanaka et al. | 440/12.51 |
| 6,834,829 B2 * | 12/2004 | Dunagin, Jr. | 244/26 |
| 6,837,457 B2 * | 1/2005 | Kirjavainen | 244/17.23 |
| 6,883,750 B2 * | 4/2005 | Gmirya | 244/54 |
| 7,032,861 B2 * | 4/2006 | Sanders et al. | 244/23 A |
| 7,802,755 B2 * | 9/2010 | Poltorak | 244/17.27 |
| 7,873,444 B1 * | 1/2011 | Ehrmantraut et al. | 701/2 |
| 8,256,705 B2 * | 9/2012 | Smith | 244/12.1 |

FOREIGN PATENT DOCUMENTS

| | | |
|---|---|---|
| FR | 2563803 | 11/1985 |
| FR | 2724905 | 3/1996 |
| SU | 990582 | 1/1983 |

\* cited by examiner

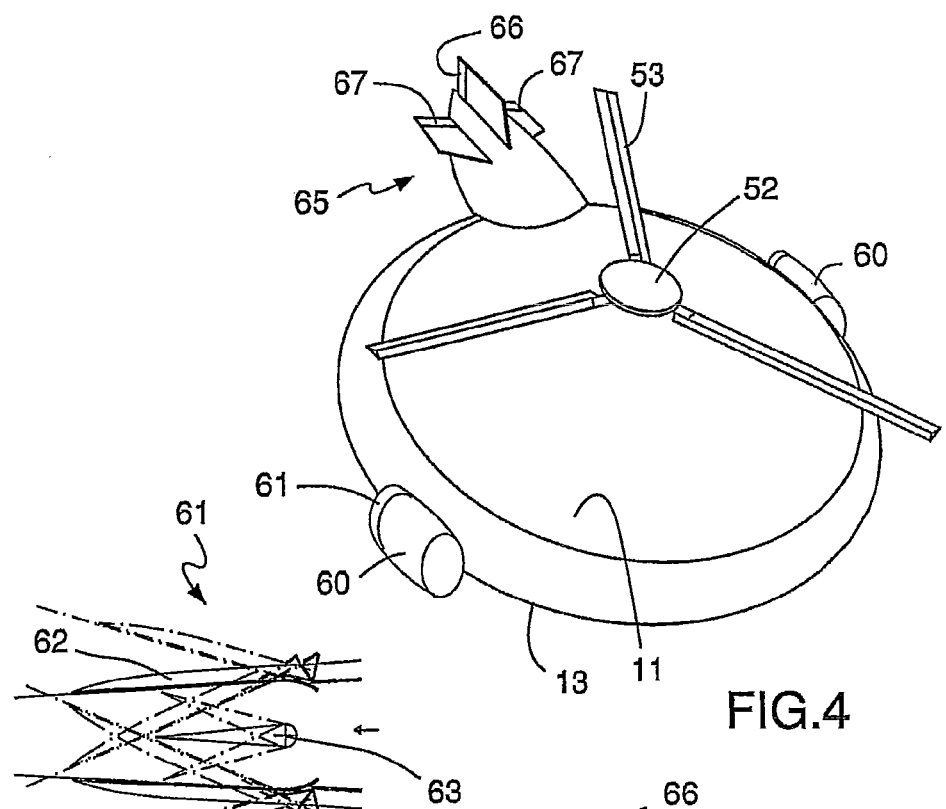
FIG.4
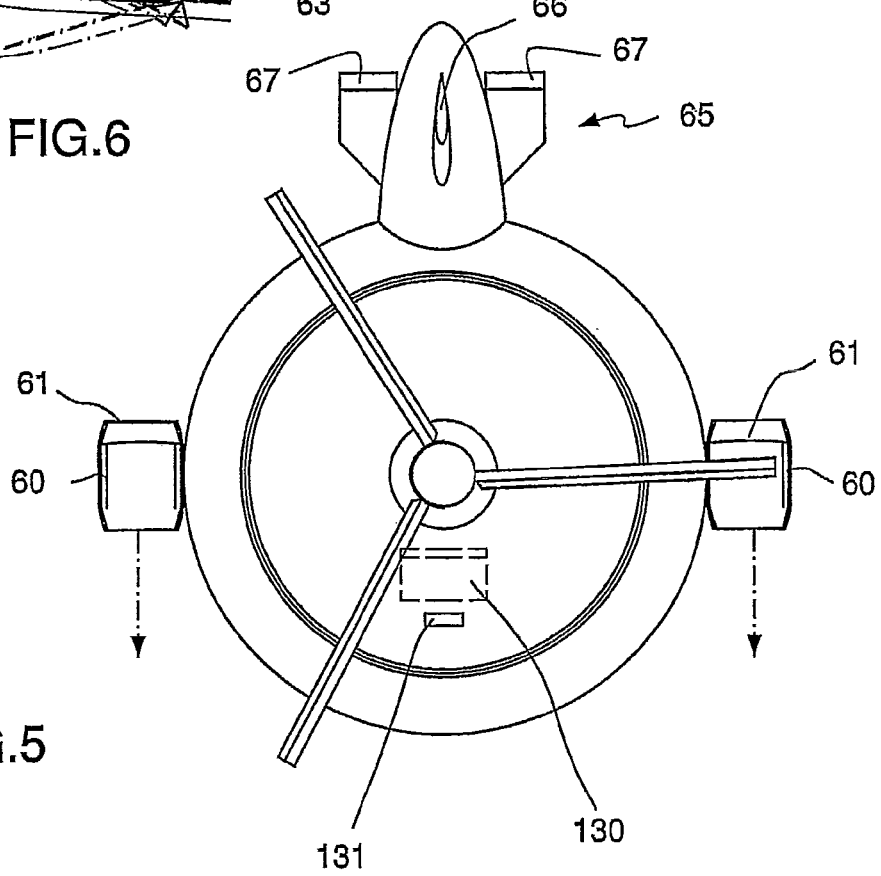
FIG.6
FIG.5

LIFE-SAVING VEHICLE

The present invention concerns a self-propelled lifesaving vehicle according to the introduction to claim 1.

The lifesaving vehicle that is described here is intended to be used in a number of different places and in a number of different rescue operations, not only on land but also at sea. It may also be used as a vehicle.

It is widely known that many lifesaving vehicles are often totally useless when they are most acutely needed. These problems normally consist in that known lifesaving vehicles have been developed to cope with only one or a few lifesaving operations, while they lack the multiuse capabilities and flexibility that are required on many occasions for their effective use in all extreme situations that can arise in practice. In addition to the limited field of use of known lifesaving vehicles, one of the major problems with known lifesaving vehicles is that they normally lack the possibility for an arrangement for self-propulsion or that they are equipped with arrangements for propulsion that allow only limited possibilities for displacement. A lifesaving vehicle with integral propulsion makes it possible for those in danger to rapidly and efficiently travel from a dangerous region to a safer place in the vehicle.

A first purpose of the present invention, therefore, is to achieve a new and improved type of lifesaving vehicle designed as a capsule to house people in a safe manner, and demonstrating high flexibility and applicability in a range of different lifesaving operations through it being possible for the vehicle to rapidly and efficiently travel from a disaster area to a safer location in different media that surround the vehicle. A second purpose of the invention is to achieve a lifesaving vehicle that can travel simply from dangerous regions due to its high degree of manoeuvrability.

Figure 1:
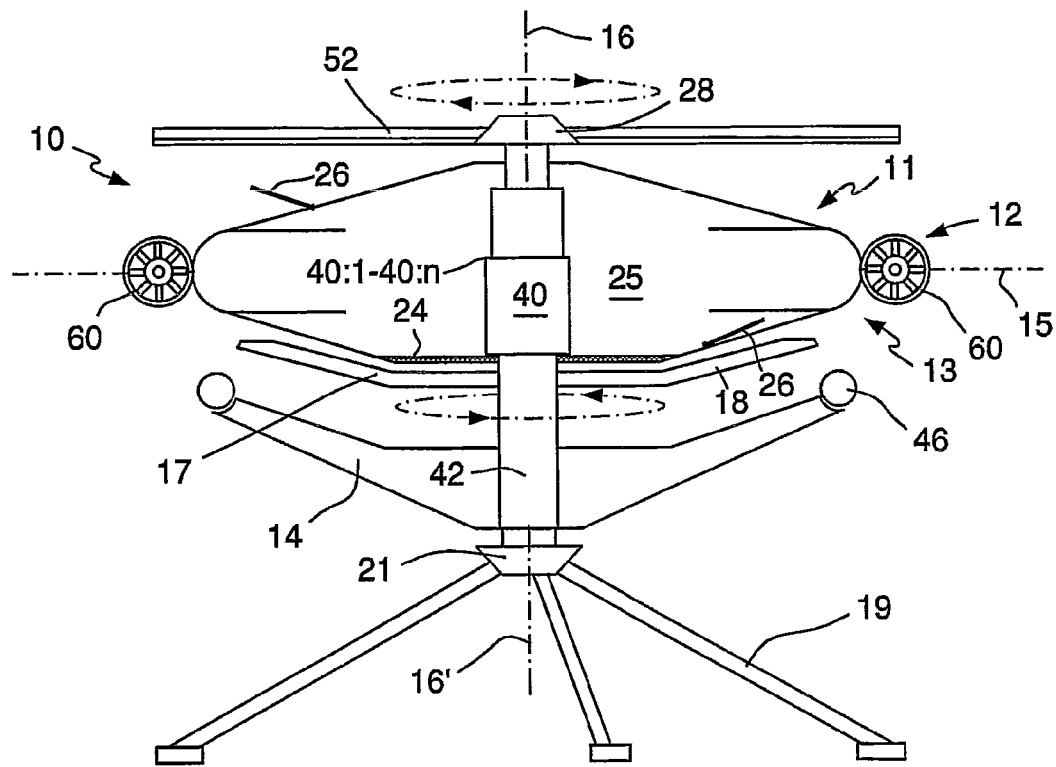
Figure 2:
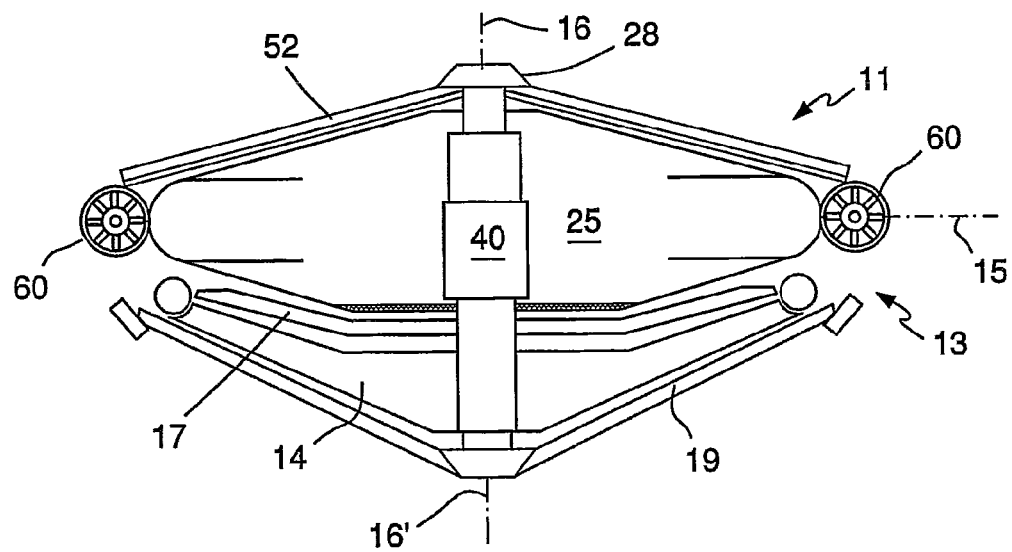
Figure 3:
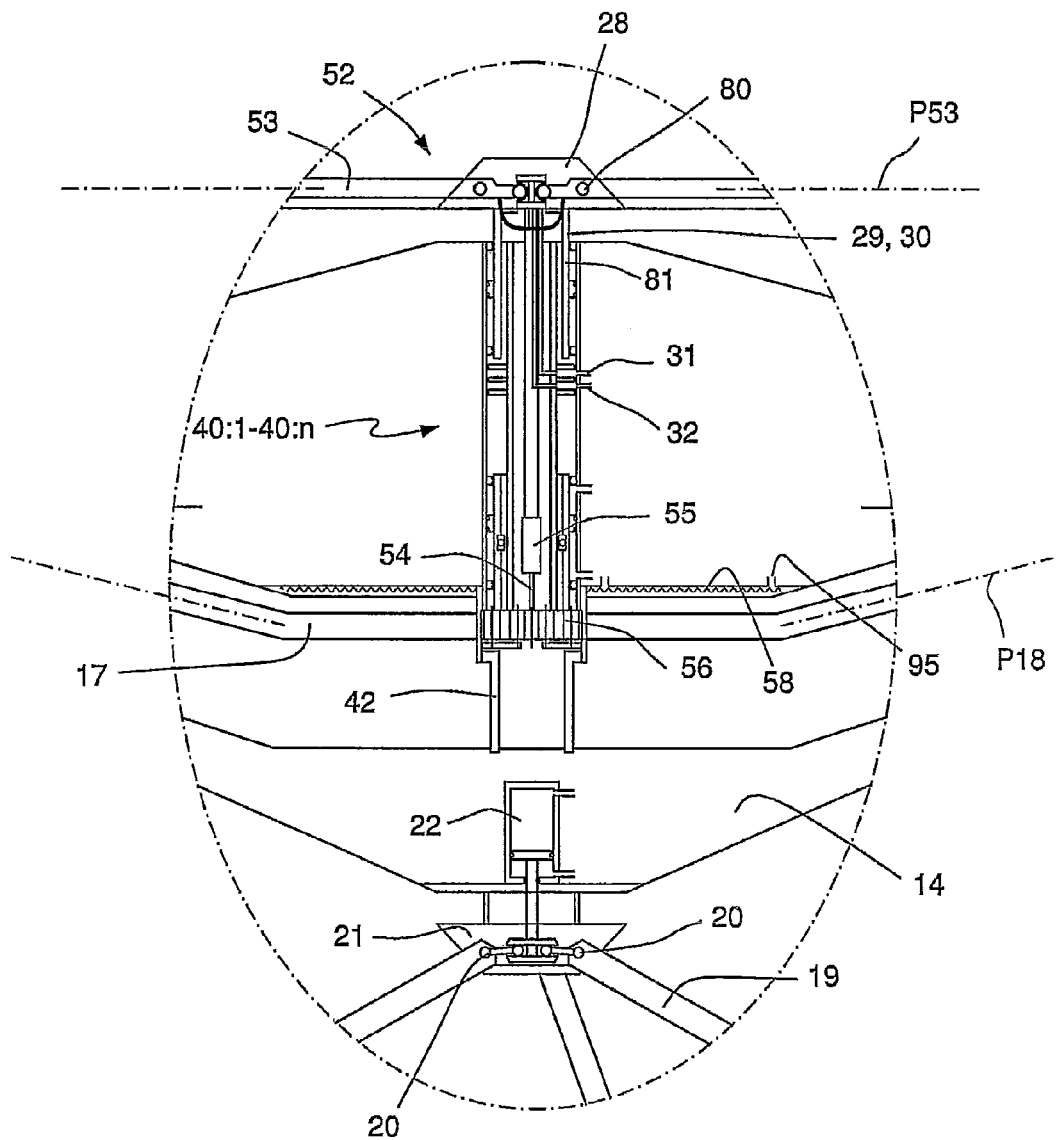
Figure 7:
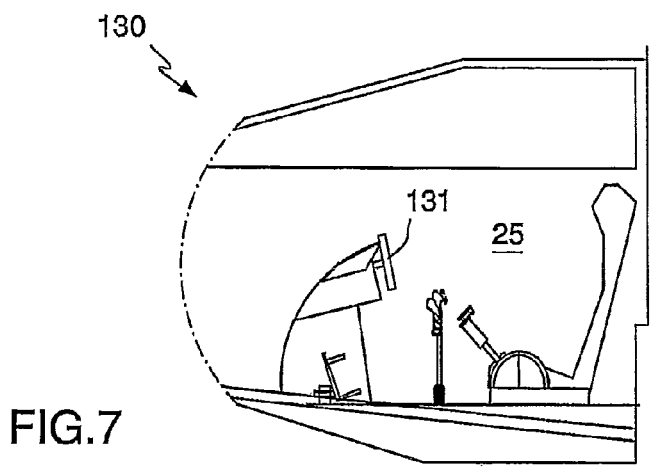
Figure 8:
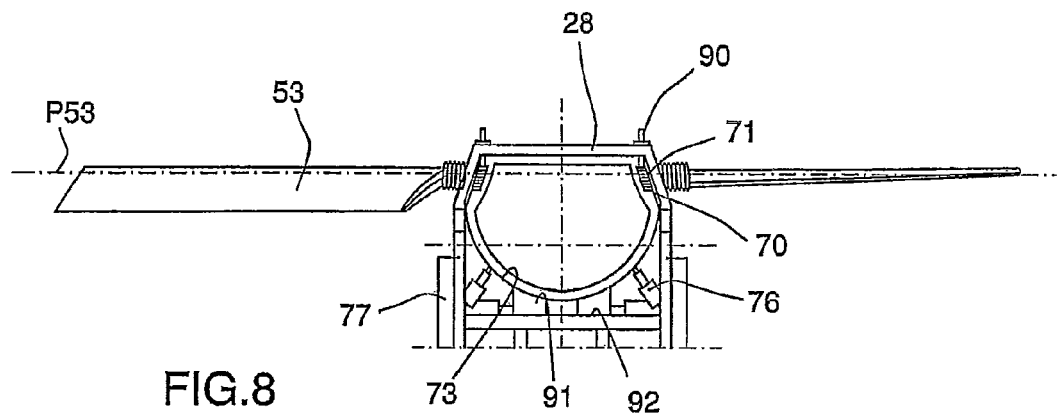
Figure 9:
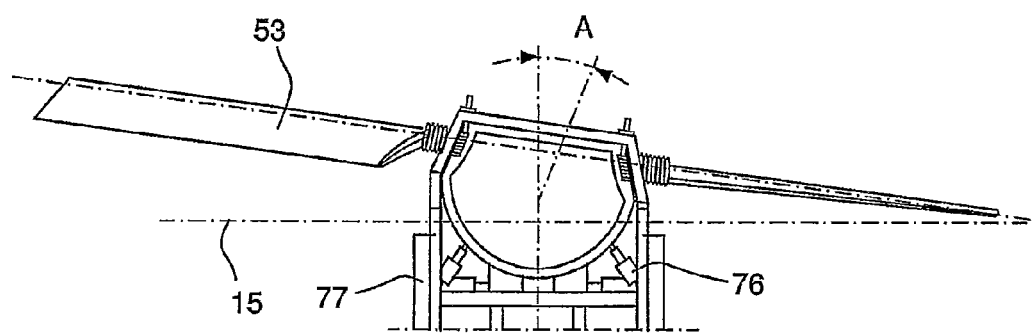

The invention will be described below with reference to the attached drawings, of which FIG. 1 shows a longitudinal section of a lifesaving vehicle in an operational mode with extended rotor and extended support legs according to the invention, FIG. 2 shows a longitudinal section corresponding to FIG. 1, but with the rotor and support legs of the vehicle arranged in their retracted resting positions, FIG. 3 shows a sectioned part at an enlarged scale, a telescopic arrangement placed centrally in the lifesaving vehicle, such as an inner cylindrical cover formed from vertically extending circularly cylindrical tubes that are arranged telescopically one inside the other, FIG. 4 shows a perspective view of the lifesaving vehicle viewed obliquely from above, FIG. 5 shows a plan of the vehicle viewed directly from above, FIG. 6 shows a cut-out part, partially in section, of an outlet arrangement that is a component of a drive motor that is a component of the vehicle, FIG. 7 shows schematically a side view of control means that are a component of the vehicle, FIG. 8 shows schematically a side view, with partially exploded and removed parts, of a rotor unit that is a component of the vehicle, and FIG. 9 shows the rotor unit schematically in a side view corresponding to FIG. 7, but set into an alternative position.

With reference to FIGS. 1 and 2, a lifesaving vehicle 10 is shown, which it is appropriate to describe as a vehicle with a body, such as a hull in the form of a considerably flattened sphere or disk, intended to function not only flying in air but also on land. The vehicle 10 is intended also when in a contracted or withdrawn condition to function in water, and in this case as a hull, floating as a covered boat. The term "body" that is used here concerns the complete outer shell of the vehicle, and consists of an upper part 11, located above a surrounding stabilisation part 12 that constitutes the broadest or widest part of the vehicle and that is arranged midships or at the middle, and a lower part 13 located under the said surrounding stabilisation part. Arranged underneath on the lower part 13 is a stabilisation means 14 manufactured from a solid material intended to be located under the surface of the water when the vehicle is in water. It should be emphasised that the surrounding stabilisation part 12 that is located midships extends around the circumference of the vehicle at a horizontal axis 15 or in a horizontal plane, and that a vertical axis 16 passes at right angles to the geometrical central point of the stabilisation part that surrounds the vehicle and is located midships. The stabilisation means 14 that is located beneath can be described as a ballast that demonstrates the form of a disc-shaped and hollow truncated cone or pyramid, the broader end of which is facing upwards and is provided with an inverted bowl form that corresponds to the outer surface of the bottom part such that it can be placed in close contact with the said bottom part. This is shown particularly clearly in FIG. 2. One of the purposes of the stabilisation means 14 is to function as ballast and prevent the vehicle from rolling when it is in water, whereby the stabilisation means is located under the surface of the water. This stabiliser offers during wave motion sufficient resistance to prevent the vehicle from "surfing" on the waves and to ensure that it retains its upright stable position during all conditions of sea state. The stabilisation part 12 that is located midships may be equipped also with handles in order to make it easier for swimmers, and it may be equipped also with fenders in order to absorb impacts, if the vehicle should collide with foreign objects while in water.

A rotor 17 that can be rotated around the vertical axis 16 of the vehicle and having a number of blades 18 is arranged in a compartment that is limited by the stabilisation means 14, when this is in its withdrawn position against the lower part 13. This rotor 17 is primarily intended to act as a propeller and it has the function also of achieving a lifting force for the lifesaving vehicle 10 when this is in water. The rotor 17 comprises four rotor blades 18 that are distributed with mutually equal circular separations in the first plane P18, principally perpendicularly to the axis of rotation 16.

Three support legs 19 that can be raised and lowered are arranged lower down on the lifesaving vehicle 10, or to be more precise, on the lower side of the stabilisation means 14. With reference also to FIG. 3, the said support legs 19 are attached in a jointed manner at 20 to a central hood-shaped part 21 of the stabilisation means 14 and can be lowered together by means of a piston-cylinder arrangement 22 from a withdrawn position as is shown in FIG. 2, where the support legs extend parallel to the downwards-facing side of the stabilisation means 14, such that the vehicle can rest on the support legs in the manner that is shown in FIG. 1.

The shell-shaped body of the lifesaving vehicle 10, formed from an upper part 11 and a lower part 13, is internally provided with reinforcing walls and transverse walls. Furthermore, it is appropriate that the lifesaving vehicle 10 be provided with all conceivable equipment, such as radio, radar reflectors, arrangements for comfort, drive motors and lifesaving equipment, all of which is essentially stored and placed into suitable compartments (not shown in the drawings). An internal floor 24 is arranged in the lower part 13, and this forms the bottom of the passenger or personnel compartment 25, intended to house a relatively large number of people in relatively comfortable and safe conditions.

Hatches 26 or companion hatches are arranged at the top of the upper part 11 and at the bottom of the lower part 13. The hatches 26 are so constructed that locking and unlocking can take place both from within and from without, and these hatches are essentially of the conventional type that is used in aeroplanes.

It has been established that a suitable material for the manufacture of the lifesaving vehicle 10 is fibreglass-reinforced synthetic plastic resin material, normally fibreglass or a composite of the type that is normally used for the construction of boat hulls. An alternative material is metal, such as steel or aluminium. It is appropriate that the hull be manufactured from transparent but coloured plastic, that allows a field of vision for the passengers of 360° in the horizontal direction. The reason that it is desirable to achieve a free field of view around the vehicle will become more clear later in this description. In order for it to be easy to locate the hatches 26, they may be manufactured from a more darkly coloured transparent material.

A principally ring-shaped seating bench that faces inwards and that is provided with a back support is arranged in the passenger or personnel compartment 25, located against the inner surface of the lower part 13 (not shown in the drawings). One part of the stabilisation part 12 that extends around the circumference of the vehicle at the horizontal axis 15 may be hollow, such as a ring-shaped surrounding cylinder, and form a float chamber. This chamber may be filled with cellular plastic. Furthermore, the stabilisation part 12 may be manufactured from a relatively thick elastic material such that it is both shock absorbing and can serve as a reinforcing and stiffening flange. A further factor relating to the efficiency of the vehicle is arranged from an upper shell-shaped cupola 28 that is located on the vertical axis 16, where this is arranged uppermost, as is shown in FIGS. 1 and 2. Also one or several ventilation arrangements, not shown in detail, are arranged at the upper cupola 28, for example an air inlet channel 29 and an air outlet channel 30. See also FIG. 3.

Between the upper part 11 and the lower part 13 there extends centrally in the centre a telescopic arrangement 40 designed as an inner cylindrical cover formed from circularly cylindrical tubes 40:1-40:n with relatively large diameters, inserted telescopically one inside the other. It is preferable that the said tubes be manufactured from steel or aluminium. The telescopic arrangement 40 comprises equipment to stabilise the vehicle when it is floating in water and it has also the task of forming a transport pathway for the transit of ventilation air down and into the capsule. The equipment to stabilise the floating capacity of the vehicle comprises a series or two or more telescopically arranged cylinders 40:1-40:n that makes it possible to vary in a telescopic manner the length of the cylindrical cover, as is illustrated in FIGS. 1 and 2. The cylinders 40:1-40:n may be equipped with collars in order to limit the relative axial motion of the cylinders. When the lifesaving vehicle 10 is floating in water, it is stabilised partially by its own inertia in the medium and partially by regulation vertical upwards or downwards of the centre of gravity of the capsule, which takes place by displacement of the stabilisation means 14 downwards, away from the vehicle through the influence of the said telescopic arrangement 40. The mutual telescopic cylinder parts are displaced relative to each other by means of a hydraulic medium that is supplied to the cylinders through inlets and outlets 31, 32. See FIG. 3.

With reference to FIGS. 1-3, a displacement of the group of cylinders 40:1-40:n from the withdrawn to the extended position means that the stabilisation means 14, attached to the downwards directed free end of the innermost cylinder 42, is driven out away from the body and downwards. As a result of this, also the centre of gravity of the lifesaving vehicle is displaced considerably downwards. Sealing means 46, in the form of an elastic surrounding ring-shaped cylindrical body of, for example, some elastomer is arranged around the free edge or the circumference of the stabilisation means 14, intended to enter into sealing and supporting interaction with the lower part 13 of the capsule when the stabilisation means 14 is located at its position in which it is withdrawn against the lower part 13, through the telescopic arrangement 40. The lifesaving vehicle described above can be simply launched into the sea from a vessel or similar, due to its symmetrical form, shown in FIG. 2, when in its contracted condition.

In order for it to be possible for the lifesaving vehicle 10 to rapidly and efficiently travel to and from a dangerous region to a safer place, it is equipped with driving means that offer not only the possibility of displacement in water but also the ability to fly, although in this case without the presence of conventional wings or other fixed aerodynamic fittings. To be more precise, the lifesaving vehicle 10 has for this purpose been equipped with a rotor 52 that is located at the upper part 11 of the lifesaving vehicle 10 and rotates coaxially with the vertical axis 16. This rotor 52 is intended to generate lifting power for the vehicle 10 and is so designed that it can generate at least the lifting power that is required for lifting the vehicle from water when it contains its maximal load. The rotor 52 that is located at the top of the vehicle will hereunder be referred to as the "first rotor" while the rotor 18 that is located at the bottom of the vehicle will be referred to as the "second rotor".

Also means for rapid and efficient horizontal escape comprising a pair of jet motors 60 on diametrically opposite sides of the hull and arranged to produce a jet stream for the propulsion of the vehicle is included in the driving means of the lifesaving vehicle for propulsion. See also FIGS. 4 and 5. As is made most clear by FIG. 6, each jet motor is assigned means 61 in order to direct the outlet direction of the output flow of the relevant jet motor. This means comprises a number of control flaps 62 that can turn, by the influence of control and actuator means not shown in the drawings, around the horizontal axis 63. If the control flaps 62 are turned upwards, the outlet flow will be directed obliquely upwards relative to the principal direction of flow, while if the control flaps are turned downwards, the outlet flow will be directed obliquely downwards relative to the principal direction of flow. Thus the control flaps 62 can function as height controls for the vehicle 10.

Once again with reference to FIGS. 4 and 5, the lifesaving vehicle 10 is equipped with a control unit, generally denoted by reference number 65, which originates at the upper part 11 and extends radially outwards from the peripheral stabilisation part 12 of the vehicle. The control unit 65 comprises a radially extending body designed as a stabilisation fin provided with a side rudder 66 and height rudders 67 arranged in a pair. The lifesaving vehicle 10 tends, with the aid of the fin, to feather against the inflowing air during flight, whereby the pilot can effectively control the lifesaving vehicle 10 in the yaw direction by means of the side rudder 66. The angle of attack of the vehicle 10 with the horizontal plane can be effectively guided and controlled with the aid of the height rudders 67, particularly at high speeds of flight.

As has been described above, the driving means of the lifesaving vehicle 10 comprises a first rotor 52 located at the top of the vehicle and that can rotate around the vertical axis 16. The rotor 52 is intended to generate lifting power for the vehicle 10 and is so chosen and designed that it can generate, together with the second rotor 18, at least the lifting power that is required for lifting the lifesaving vehicle 10 from water.

With reference to FIGS. 8 and 9, the first rotor 52 comprises a set of rotor blades 53 that can be rotated by means of driving means that is a component of the vehicle and that comprises a propulsion chain 54 with a drive motor 55 and the associated transmission in the form of epicyclic gearing 56 and electronic control circuits. The motor and the propulsion chain are housed at the bottom of the telescopic arrangement 40 that is located in the centre of the personnel chamber 25 and that extends vertically. Due to their location low in the vehicle, the motor 55 and the propulsion chain 54 contribute through their weight to making the centre of gravity of the vehicle low, which is an advantage, not least when the vehicle is floating in water. In a similar manner, also a number of fuel tanks 58 are integrated into a central lower part of the lifesaving vehicle, which tanks act as effective ballast, particularly when they are full.

The rotor 52 supports a first group of three rotor blades 53 that extend, with circularly equal mutual separation when they are in their active, extended position, in the first plane P53, essentially perpendicular to the axis 16 of rotation, i.e. essentially parallel with the horizontal plane 15. The rotor blades of the principal rotor are each attached jointed at 80 at the top of the vehicle and can be tilted in concert, withdrawn inwards and downwards towards the upwardly facing side of the upper part 11 to an inactive position, with the aid of piston-cylinder arrangements 81. With reference also to FIG. 2, it should be understood that the blades 53 in the said withdrawn position extend in close association with the flattened spherical or disk-shaped upper part 11 of the vehicle. ["This is", missing main verb?] in the same way as the support legs 19 described above extend in close association to the lower part 13 of the vehicle 10 such that overall, when in the withdrawn position, the complete lifesaving vehicle forms a compact and robust unit of small dimensions, principally demonstrating the form of two united concentrically halves, with outwardly directed arches.

FIG. 3 and FIGS. 8-9 show in more detail how the angle of attack of the rotor blades 53 of the rotor 52 are controlled and monitored. Various degrees of lifting power for the lifesaving vehicle 10 can be generated through variation of the angle of attack. It should be understood that the lifesaving vehicle obtains a large lifting power vertically upwards through the rotor 52 while it can at the same time be caused to move parallel to the horizontal plane by a small force. The drive motor 55, which is generally intended to work with a constant speed, can be freely placed into and removed from power-transmitting connection with either the rotor 52 or the propeller 17 through a transmission that is a component of the said propulsion chain 54 and that interacts with the relevant ring gear and with the pinions that interact with it located at the end of a drive shaft (not shown in the drawings) that extends from the motor.

As is made most clear by FIGS. 8 and 9, the rotor unit 52 comprises an adjuster 70 that makes it possible to adjust, through the influence of a rotation unit 71 that allows rotation of the rotor blades 53 around an axis 54 that extends perpendicularly to the vertical axis 16, the angle of attack of each rotor blade independently of each other and continuously to retain a suitable setting during the complete cycle of the blade during one rotation. The rotation unit 71 turns the rotor blades through the influence of a cogged wheel, which demonstrates a lack of teeth at selected parts in order to avoid excess rotation of the rotor blades. A compressed air piston is located at the connection between the rotor blade 53 and the rotor unit 52, surrounded by a spring that serves as a damper. The adjuster 70 is influenced by means of a control system that is located onboard, with which not only the rotor speed but also the angle of attack can be regulated such that the rotors generate the lifting power required and the vehicle obeys the desired flying commands. It should be realised that the lifting power of the vehicle 10 is increased more efficiently through increasing the angle of attack of the rotor blades rather than changing the rate of revolution of the motor 55.

Not only is it possible to guide and monitor the angle of attack of each individual rotor blade 53 independently of each other, it is also possible to guide and monitor the angle A of the complete rotor unit 52 relative to a normal 16 to the horizontal plane 15. In order to allow this, the rotor unit is arranged freely in the manner of a ball in a bearing seating 73 designed as a holder, such that the rotor unit, supporting the rotor blades 53 and the rotation unit 71 with the adjuster 70 for the setting of the angle of attack of these, can pivot freely along a chord and take up different angular positions relative to the horizontal plane 15. The varying angular position A of the rotor unit relative to the horizontal plane is guided and monitored by means of several electrically powered piston and cylinder arrangements 76 fixed jointed between the rotor unit 52 and a fixed bearing housing 77.

The reference number 90 denotes electronically controlled locking means with which the individual rotor blades 53 can be locked at the desired angular position. The reference number 91 denotes wedge units that can be displaced along guide rails 92, and with whose aid the rotor unit 52, supported in the manner of a bowling ball, can be locked by wedge action at the selected angular position relative to the horizontal plane 15. One of the major advantages of it being possible to set the complete rotor unit 52 at an angle relative to the horizontal plane 15 is that this makes it possible to set the direction of travel of the vehicle very rapidly and efficiently.

The double propulsion units 60 that are arranged on diametrically opposite sides of the body of the vehicle and that drive the vehicle during level escape are shown in more detail in FIGS. 4 and 5. The two propulsion units 60 are arranged at a distance in the radial direction out from the hull at the midships and they are located at the surrounding stabilisation part 12 in a common horizontal plane that coincides with the horizontal plane 15. The propulsion units 60 comprise jet motors that can be manually influenced by control means inside the vehicle. The propulsion units 60 are supplied with fuel through lines 95 that stretch from the fuel tanks 58 of the vehicle.

In order for it to be possible that the lifesaving vehicle 10 carry out motion in the horizontal direction (i.e. level escape), left-right yaw and vertical motion efficiently, the means 61 described previously are used, which means make it possible to control the outlet direction of the outlet flow of each jet motor 60. The outlet flow can be directed obliquely upwards or downwards relative to the principal direction of flow through turning the control flaps 62 around the relevant horizontal axis 63. If the control flaps 62 are turned downwards, the outlet flow will be directed obliquely downwards relative to the principal direction of flow, which can be used in order to significantly increase the lifting power of the vehicle 10 vertically upwards, for example from the surface of the water when it is floating.

It should be understood that the vehicle can in this manner, starting at a position in water, rise very rapidly essentially vertically straight up with the aid of a combination of the rotor 52 and the jet motors 60 to a position above the surface of the water, and by resetting of the control flaps such that the outlet flow from the jet motors is directed directly backwards can very rapidly set course and move forwards in level escape from a disaster area.

The reference number 130 in FIG. 7 denotes a control unit with a steering wheel at a control location 131 for a pilot. The control location comprises a computer and similar electronic control units for the control of the vehicle.

The term "rotor" as it is used here is used to denote any rotatable part that is driven by a motor, i.e. according to the invention not only a rotor but also a propeller is included by the term. Furthermore, it is appropriate that the first rotor 52 and the second rotor 17 are arranged for rotation around the relevant axis 16, 16' in opposite directions with mechanical synchronisation, such that the body achieves the desired stability and balance against undesired self-rotation due to the appearance of essentially equal torques in opposite directions.

The invention is not limited to what has been described above and shown in the drawings: it can be changed and modified in several different ways within the scope of the innovative concept defined by the attached patent claims.

The invention claimed is:

1. A lifesaving vehicle comprising a hollow body, which body, comprises an upper part and a lower part and forms an internal passenger compartment, whereby the body comprises a stabilising arrangement with a float chamber that, stabilises the vehicle when it is in water, a telescopic arrangement arranged centrally in the body and extending vertically through the body and comprising an internal substantially cylindrical cover formed from substantially cylindrical tubes that are inserted telescopically one inside the other, a stabilisation system arranged at the lower part of the body and comprising a substantially disc-shaped unit that extends radially out from the vertical axis of the vehicle, and which stabilisation system can be displaced in a vertical direction downwards from the lower part through activation of the telescopic arrangement, the vehicle, in order for it to travel not only over land but also in water, comprising:
a first and a second rotor mounted for rotation around a first and a second axis respectively in opposite directions of rotation, of which one rotor is arranged extending out from the upper part of the vehicle while the second rotor is arranged extending out from the lower part of the vehicle, whereby the first rotor comprises a set of rotor blades (52) that extend in a first plane of blades and the second rotor comprises a number of rotor blades that extend in a second plane of blades,
a motor supported by the vehicle with its associated transmission, by means of which the said first and second rotors are arranged for rotation and the generation of vertical lifting power in a medium that surrounds the vehicle, which medium may be constituted by water or air,
a pair of propulsion units that are mounted on diametrically opposite sides of the vehicle for horizontal propulsion of the vehicle and for the balancing of a torque that is produced by one of the rotors, in particular the first rotor,
at least one stabilisation fin that is arranged extending radially out from the outer periphery of the vehicle, and which stabilisation fin is equipped with side rudders and a height rudder for manoeuvring the vehicle through the influence of flows of medium through which the vehicle passes.

2. The vehicle according to claim 1, whereby the motor that is supported by the vehicle and its associated transmission are located along the vertical axis in a compartment between the first and the second rotor.

3. The vehicle according to claim 1, whereby the two propulsion units each comprises a jet motor intended to produce a jet stream.

4. The vehicle according to claim 3, whereby each propulsion unit is assigned means to control the outlet direction of the outlet flow of the jet motor.

5. The vehicle according to claim 4, whereby the control means comprises a control flap that, through the influence of control and actuator means, can be rotated around the relevant horizontal axis.

6. The vehicle according to claim 1, whereby each one of the rotor blades that are components of the first rotor is fixed jointed with the upper part of the vehicle and, starting from an extended position in which the rotor blades extend in the plane of blades, designed to be reset into an inactive position, through the influence of a piston and cylinder arrangement that operates between each rotor blade and the upper part, through being folded in concert inwards and downwards towards the side of the upper part that faces upwards.

7. The vehicle according to claim 1, whereby the stabilisation system at is lower side that faces downwards comprises a number of support legs that can be lowered, each one of which is fixed jointed at a mechanism arranged at a lower part of the stabilisation system and, starting from a folded, inactive position in which the support legs extend parallel with and along the downwards facing side of the stabilisation system, designed to be reset to an active position by the influence of a piston and cylinder arrangement that is a component of the stabilisation system, and to be lowered in concert outwards and downwards from the stabilisation system, and such that the vehicle can rest on the support legs when it is on land.

8. The vehicle according to claim 1, whereby the circularly cylindrical tubes of the telescopic arrangement that are telescopically inserted one inside the other are so arranged that not only the first rotor located at the upper part but also the stabilisation means located at the lower part when seen from its withdrawn position, are displaced a certain distance vertically out from the body along the associated axis when the telescopic arrangement is activated.

9. The vehicle according to claim 8, whereby the second rotor is placed within a compartment that is limited between the stabilisation means and the lower part of the body, when the rotor is located at its withdrawn position against the lower part.

10. The vehicle according to claim 8, whereby the first rotor is arranged freely floating in a bearing seating with the possibility of taking up varying angular positions relative to the horizontal plane through the influence of a number of electrically powered piston and cylinder arrangements that are fixed jointed between the rotor unit and a fixed bearing housing that supports the bearing seating.

11. The vehicle according to claim 1, whereby the body has a shape generally of a sphere or disk flattened along a vertical axis and having its greatest width in a horizontal plane.

12. The vehicle according to claim 1, whereby the float chamber comprises a chamber running around the broadest part or centre of the vehicle.

* * * * *